D. C. MULVIHILL.
SAND GATE.
APPLICATION FILED MAR. 18, 1920.
1,409,398.
Patented Mar. 14, 1922.
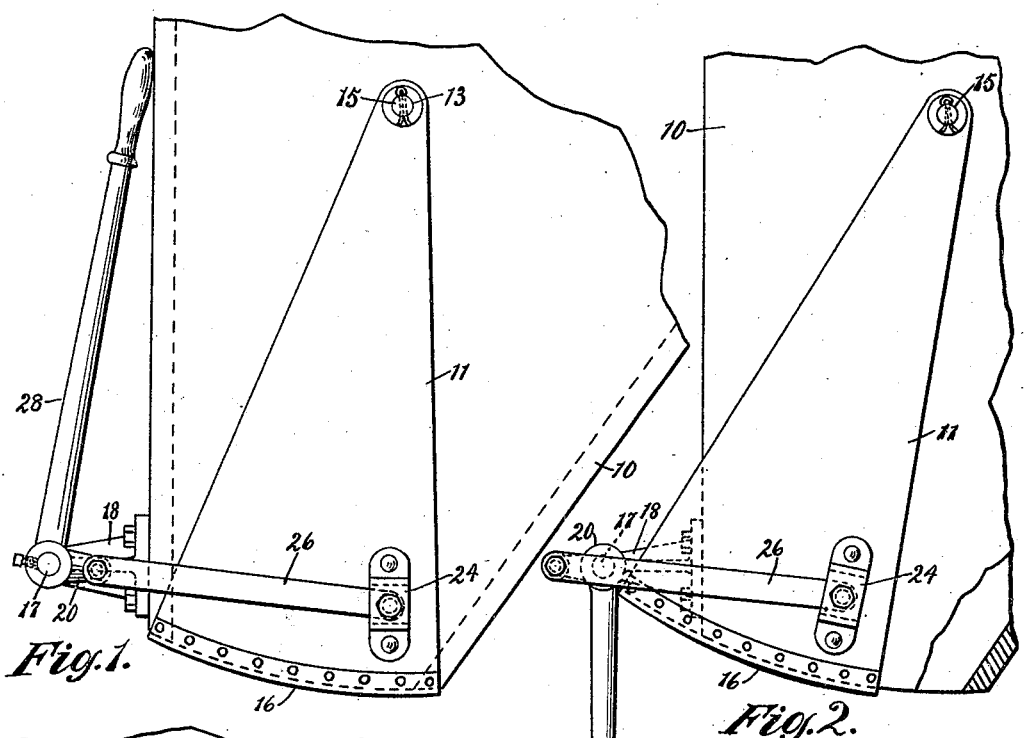
Fig.1.
Fig.2.
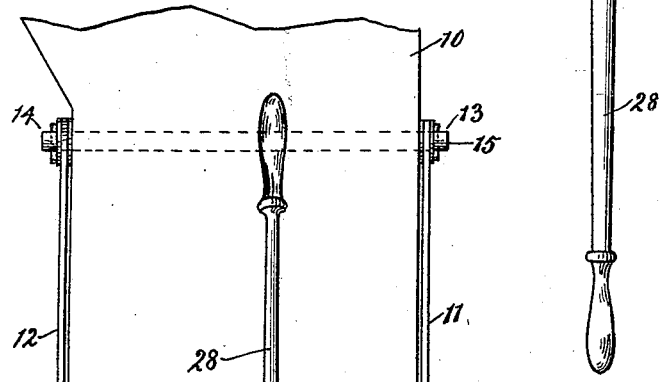
Fig.3.
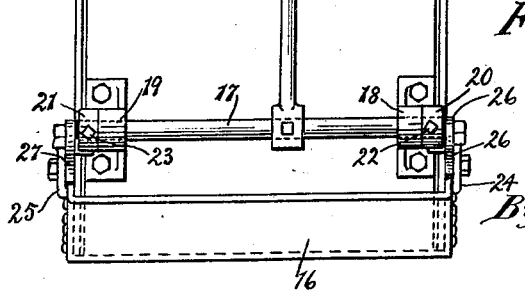
Inventor:
Daniel C. Mulvihill
By Gillson & Gillson
Att'ys.

UNITED STATES PATENT OFFICE.

DANIEL C. MULVIHILL, OF HANNIBAL, MISSOURI.

SAND GATE.

1,409,398.   Specification of Letters Patent.   Patented Mar. 14, 1922.

Application filed March 18, 1920. Serial No. 366,886.

*To all whom it may concern:*

Be it known that I, DANIEL C. MULVIHILL, a citizen of the United States, and resident of Hannibal, county of Marion, and State of Missouri, have invented certain new and useful Improvements in Sand Gates, of which the following is a specification, and which are illustrated in the accompanying drawings, forming a part thereof.

This invention relates to sand gates, and has for an object the provision of a device of this nature that can be successfully operated to cut off the flow of sand, and which will give continuous service.

An illustrative embodiment of the invention is shown in the accompanying drawings, in which—

Figs. 1 and 2 are side elevations of the gate closed and open, respectively, Fig. 2 being partly broken away; and Fig. 3 is an end elevation.

A device embodying the invention is shown as applied to the opening of a hopper 10, which may be a hopper to supply molding sand to a molding machine.

The gate proper is shown as comprising a pair of sectors 11, 12, pivotally mounted at 13, 14, as by being mounted on the ends of a shaft 15, passing through the walls of the hopper 10. The leaf 16 of the gate is shown as secured to the arcuate margins of sectors 11, 12, as by being turned into flanges overlapping said margins and riveted thereto. The sectors 11, 12, and the leaf 16 are preferably formed of sheet steel. As shown, the leaf 16 and supporting portions 11, 12, therefor comprise a portion of the curved surface and sectors of the end surfaces, respectively, of a cylinder.

To actuate the gate a crank shaft 17 is shown journaled in brackets 18 and 19, and having cranks 20 and 21 rigidly secured to its ends, as by set-screws 22 and 23. Cranks 20 and 21 are shown as connected to loops 24 and 25, as by pitmen 26, 27.

To cause oscillation of the crank shaft 17 a hand lever 28 is shown, which should be long enough to provide the considerable leverage which is required to operate a gate of this character. The pressure of the sand in the hopper 10 has no tendency to force the gate open, nor is it necessary to lift the sand to the slightest degree in closing the gate. The gate forms a bottom for the hopper and is merely slid out from under the sand in opening and back under the sand through the outflowing stream in closing.

Minor changes may be made in the physical embodiment of the invention without departing from its spirit.

I claim as my invention—

A sand gate comprising, in combination, a sand hopper, a leaf, and supporting portions therefor comprising a portion of the curved surface and sectors of the end surfaces, respectively, of a cylinder, said end members pivoted to said hopper adjacent the center of curvature of the leaf, a crank shaft journaled in brackets upon said hopper, cranks rigidly secured to the end of said shaft, pitmen connecting said cranks to said end members, and a hand lever rigidly secured to said crank shaft for actuation of said crank shaft.

DANIEL C. MULVIHILL.